June 24, 1969     N. P. GRELLER     3,451,547
SORTING CONVEYOR CONTROL
Filed Aug. 10, 1967     Sheet 1 of 2
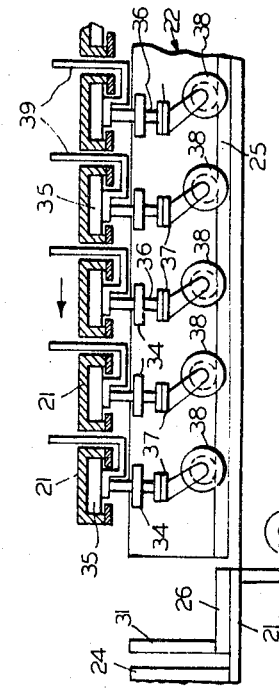
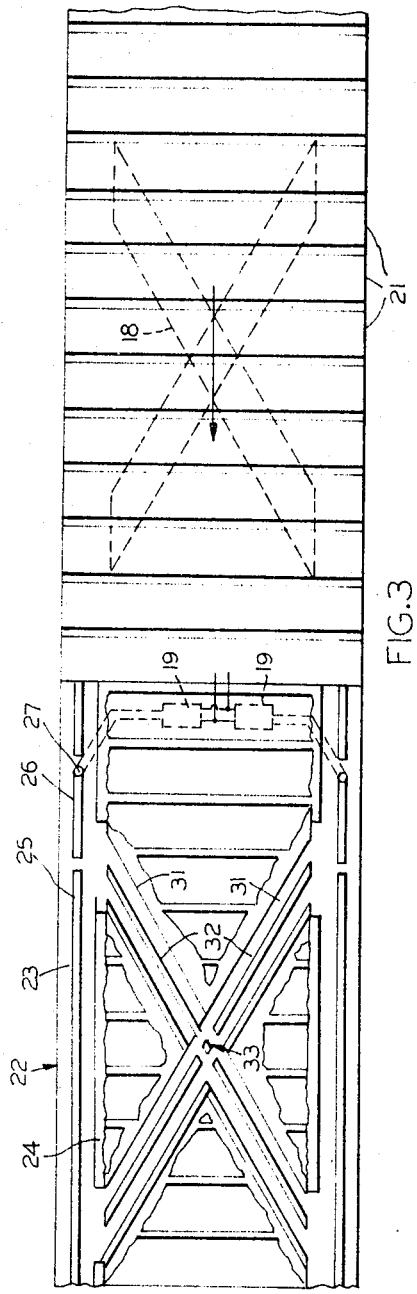
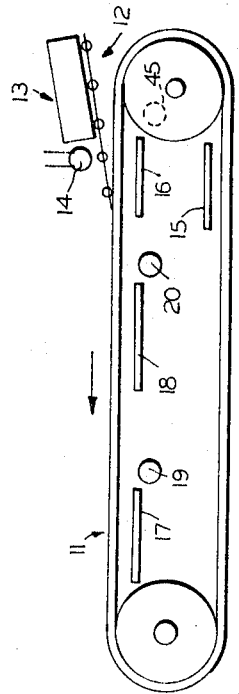
INVENTOR
N. P. GRELLER
BY *Wodge and Sons*
ATTORNEYS United States Patent Office 3,451,547
Patented June 24, 1969

3,451,547
SORTING CONVEYOR CONTROL
Nelson P. Greller, 2800 Allendale Place NW.,
Washington, D.C. 20008
Filed Aug. 10, 1967, Ser. No. 659,736
Int. Cl. B07c 5/36, 9/00
U.S. Cl. 209—74
2 Claims

ABSTRACT OF THE DISCLOSURE

A sorting conveyor has a plurality of article removing stations. The removal stations are arranged on both sides of the conveyor. Each removal station has a removal station opposite it on the other side of the conveyor. The conveyor includes an endless conveyor apron provided with a plurality of longitudinally spaced, transverse guideways extending across said conveyor apron. A guide is slidable along each guideway and carries a cam follower. A pair of cam rails is associated with each opposing pair of removal stations. A switch is provided at the entrance end of each cam. The switch is normally inactive, but each pair of switches may be simultaneously moved to active positions in which any cam follower reaching said switches is switched onto the associated cam rail. Movement of the cam follower along said cam rail causes the guide to move along its associated transverse guideway. Such movement of the guide actuates article removal means whereby an article carried by the apron is removed at the selected removal station. The switches are automatically controlled in timed relation to travel of the article. The automatic control also controls over which side the article is to be removed from the conveyor apron.

Background and summary of the invention

The invention will be described as it is embodied in a sorting conveyor of the type disclosed in U.S. Patent 2,868,394. The conveyor apron is essentially a conventional slat conveyor. The slats extend transversely between a pair of drive chains trained around pairs of sprockets at opposite ends of the conveyor. Each slat has a slide slidable in a guideway formed therein. Each slide has a cam follower dependent from it and carries an upright which projects upward above the article-receiving surface of the conveyor. A pair of diverter cam rails is provided at each removal station and each has a switch at its entrance end. Adjacent the end of the conveyor at which articles to be sorted are received there is a selector cam rail also equipped with a switch at its entrance end. The switches have a normal inactive position in which the cam followers are not diverted onto the cam rail. The cam followers are all caused to travel along the side of the conveyor on which the selector cam rail switch is located. The selector cam switch is left in normal position unless it is desired to move the cam follower to the other side of the conveyor. This selection of the side of the conveyor along which the cam follower moves after it passes the selector cam rail determines the direction in which a particular article will be removed when it reaches a selected removal station. The selector switch is actuated by a solenoid connected in an electrical control circuit. The control circuit includes means for producing an electrical signal representative of the length of the article to be removed. This signal is supplied to a memory device through an input circuit which selectively includes or does not include the solenoid. The signal is stored in a selected one of a plurality of storage devices. There is one storage device for each pair of diverter cam rail switches located at the successive opposed removal stations. The stored signal is delivered to the solenoids which actuate the diverter cam switches in timed relation to the travel of the article selected for removal at a selected station. Signal delivery occurs as the cam follower carried by the leading one of the article carrying slats approaches the diverter cam switch and causes both switches at the opposed removal stations to move to active position and to maintain the switches actuated during the time required for the article to be conveyed a distance equal to its own length. The switch means then return to inactive position. Actuation of the switch for this interval of time will cause all of the cam followers, carried by the guides associated with the slats on which the article rests, to move onto the diverter cam rail. These guides and article-engaging uprights carried thereby will cause the article to move across the conveyor, and will push the article off the conveyor in a manner characteristic of U.S. Patent 2,868,394. A return cam rail is provided, usually on the lower run of the slat conveyor, and causes any cam followers on the other side of the conveyor to move to that side of the conveyor along which they are desired to approach the selector cam rail so that they may be prepared to perform their next intended removal excursion.

Description of the drawings

A preferred embodiment of the invention will be described with reference to the accompanying drawing in which:

FIG. 1 is a diagrammatic showing of the complete sorting system.

FIG. 2 is a fragmentary elevation, partly in section, showing the slat conveyor and the associated guides, slides, cam follower rollers, the side rails and the entrance end of one cam rail. Certain slats are omitted to facilitate illustration.

FIG. 3 is a top plan view of a part of the conveyor. Certain of the slats are broken away in part to facilitate understanding the operation.

Description of the preferred embodiment

Figure 4:
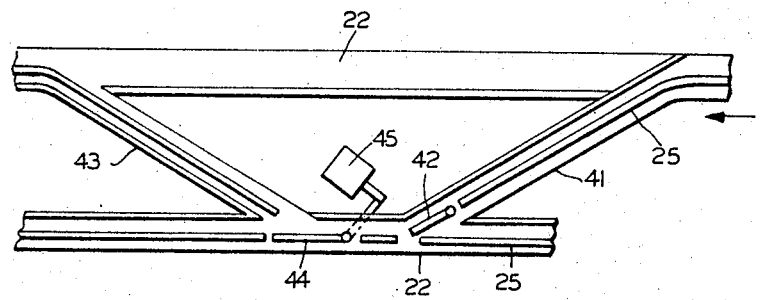
FIG. 4 is a developed plan view of the return cam rail and the selector cam.

Refer first to FIG. 1. The slat type sorting conveyor is generally indicated at 11 and includes a suitable supporting frame omitted from the drawing for clarity and because slat conveyors are well known in the conveyor art. A lead-on conveyor 12 delivers articles such as 13 onto the slat conveyor 11. As the article 13 approaches conveyor 11, it is moved at a speed equal to that of conveyor 11 so that it will not slip during transfer between conveyors 12 and 11. An article length detector 14 is associated with the lead-on conveyor 12 and supplies a length signal to a memory device in the control device to be described. Reference numeral 15 indicates the return cam rail, and reference numeral 16 indicates the selector cam rail. Spaced pairs of diverter mechanisms are indicated at 17 and 18. Switch control solenoids 19 and 20 are shown associated with each set of diverter cam rails. The article 13 may be removed by action of a selected one of the sets of diverter mechanisms. This mechanism will cause article 13 to be removed in a direction toward or away from the viewer. In other words, article 13 may be removed to any one of four different destinations by this schematically shown sorting conveyor.

As shown in FIGS. 2 and 3, the slat conveyor comprises a plurality of transverse slats which take the form of channel-formed transverse guideways 21. The channel section of these guideways is shown in FIG. 2. Extending longitudinally along each side of the conveyor beneath the guideways 21 are guide rails 22 formed from angle iron having a horizontal base flange web 23 and vertical web 24. A caster guiding track 25 extends longitudinally along the base flange 23. Portions of track 25 are broken away and replaced by pivoted switch blades 26 pivoted on vertical axle 27. A pair of actuating solenoids 19 are connected for energization by the control device, to be described, and are connected to actuate the switch blades 26.

Portions of the vertical webs 24 are cut away adjacent entrance and exit ends of the diverter cam rails 31. Like the guide rails 22, the cam rails 31 are angle iron. A caster guide track 32 is provided along each rail, and each includes a cross-over guide 33 at their intersection. The vertical webs are cut away sufficiently to permit passage of cam follower rollers 34 which move along the vertical webs of the diverter cam rails 31.

Referring now to FIG. 2, the diverting mechanism will be described. Each transverse guideway 21 embraces a slide member 35 which slides along the guideway. A vertical shaft 36 is fastened to each slide 21. Each shaft 36 has a cam follower roller 34 journalled thereon and carries a swivel mounting 37 for a double-flanged caster 38 which runs along track 25. Flanged casters 38 may be switched by switch blades 26 from the track 25 onto the track 32 carried by the diverter cam rails 31. By means of suitable bracket, each slide carries an upright 39 which engages the side of the article to be removed when the slide 35 is caused to move laterally across the conveyor by travel of the cam follower rollers along the cam rail 31. The diverting mechanism of removal station 18 (FIG. 1) is shown in broken lines at 18 in FIG. 3. It is identical to the diverting mechanism described above.

Refer now to FIG. 4. A return cam rail is shown at 41. Caster guiding track 25 extends along rail 41, and returns all cam follower rollers 34 moving along the upper guide rail 22 of FIG. 4 onto the lower guide rail 25 (FIG. 4). Switch blade 42 is spring biased to its illustrated position and will be moved out of the way by casters following the lower track 25 of FIG. 4. This return cam rail 41 is preferably located on the return run of the conveyor. A selector cam rail 43 extends across the conveyor in a direction opposite to that of rail 41. A switch blade 44 controlled by solenoid 45 causes selected casters 38 and their associated rollers 34 and slides 35 to move across the conveyor to the upper guide rail of FIG. 4. Solenoid 45 is controlled by the control circuit of FIG. 5.

Figure 5:
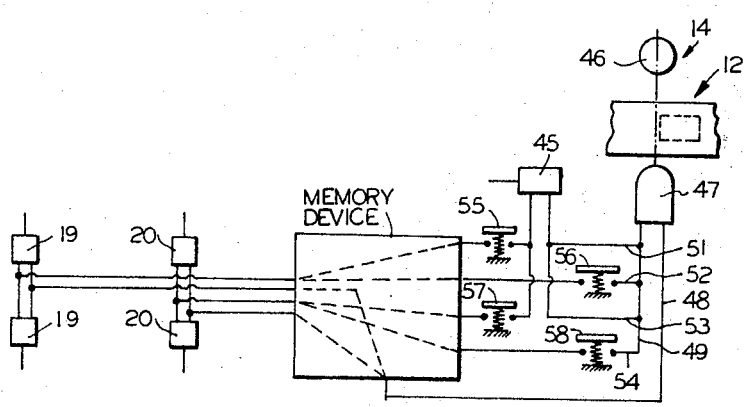
FIG. 5 is a diagram of the control circuit.

As shown in FIG. 5, the control circuit includes means 14 to produce a signal whose duration indicates article length. This means 14 includes a light source 46 producing a light beam extending across the lead-on conveyor 12 to impinge on a photosensitive cell 47. An article 13 moving toward conveyor 12 will interrupt the light beam and cause the photocell 47 through switch means (not illustrated) to cause current flow in the input leads 48 and 49. Lead 49 includes four input branches 51, 52, 53 and 54, which contain, respectively, a normally open switch 55, 56, 57 or 58. Switch 55, when closed, will cause signal current to energize solenoid 45 during its duration. Closure of switch 57 also causes solenoid 45 to be energized. The length signal can be delivered through any one of the input leads 51, 52, 53 or 54 to the memory device. The signal is stored in a first storage device if it reaches the memory device through either the input lead 51 or 52. Similarly the signal is stored in a different storage device when the signal is received through either input lead 53 or 54. One storage device is arranged to produce an output signal of the same time duration as the input signal after a time interval equal to the time required for the article 13 to travel from the length measuring device 14 to the intended removal station. The output signal is used to energize a selected pair of solenoids 19 or 20. Both solenoids 19 will be energized and both switch blades 26 will be actuated. This will cause casters and cam followers reaching switch blades 26 when the solenoids 19 are energized to be guided across the conveyor 11 by the cam rails 31.

Operation

As the article 13 approaches the length measuring station 14, an attendant will note which removal station it is destined to reach and will close a selected switch 55, 56, 57 or 58. Switches 55 and 56 control solenoids 19 at the second removal station. Closure of switch 55 energizes solenoid 45, thus causing switch blade 44 to move to switching position so as to guide the casters 38 and cam rollers 34 onto the selector cam rail 43. This causes a plurality of the article-engaging uprights 39 to move across conveyor 11 to the other side. The number of uprights 39 moved is determined by the time duration of the length signal produced at 14. All of the uprights on the slats 21, onto which measured article 13 will be delivered, will be moved across conveyor 11. Thus, all the uprights 39 aligned with article 13 will be at the upper side of the conveyor 11 as it is shown in FIG. 3. As the conveyed article reaches blade 26 located on the upper side of the conveyor, the solenoids 19 will both be actuated to move both switch blades 26 to switching position and the casters 38 will be guided onto track 32. The uprights 39 will now move across the conveyor 11 and sweep article 13 off the conveyor 11. Note that switch 26 at the lower side of the conveyor as shown in FIG. 3 will also be actuated at this time. Since all of the cam followers and casters were moved by the selector cam rail 43 to the other side of the conveyor, this switch blade 26 performs no function at this time. If switch 56 had been closed, the solenoid 45 would not have been actuated and no cam followers would have been moved across the conveyor 11 by the selector cam rail 43 but instead would have remained on that side of the conveyor along which all of them travel when the return rail 41 has been passed. As in the case of actuation of switch 55, the switches 26 will be actuated for a time period corresponding to the time signal fed to memory device. This actuation occurs as article 13 reaches the lower switch blade 26 (FIG. 3). This actuation of the diverting mechanism causes the article 13 to be removed in the opposite direction.

It is important to note that only a single signal need be stored in the memory device in order to actuate the diverting mechanism 17 to remove the article in either of two directions. The memory device may be a magnetic tape device such as is shown in Greller U.S. Patent No. 2,984,-366. It might also be a device such as the so-called "Synchro-Timer" sold by Pratt & Whitney. Such memory devices are expensive and the savings realized through the use of the present invention is important, if the conveyor includes a large number of removal stations.

I claim:

1. In a sorting conveyor means, means affording an endless conveyor apron; a plurality of spaced transverse guides carried thereby; a slide slidable along each guide; a cam follower carried by each guide; a plurality of pairs of cam rails, one rail of each pair extending diagonally from one side of the conveyor toward the other side thereof and the other rail of each pair extending diagonally from said other side of the conveyor toward said one side, the entrance ends of said cam rails being aligned laterally of the conveyor; switch means at the entrance end of each pair of cam rails, said switch means having normal positions in which they are ineffective to engage said cam followers; control means effective to move both switches of a selected pair of switches simultaneously to active positions in which cam followers, reaching a selected one of said selected pair of switches which is in said active position, are caused to move into engagement with the corresponding cam rails whereby the guide associated with a cam follower engaged by a cam rail is caused to move diagonally transversely of the conveyor; article-removing means actuated by said diagonal movement of said guide, said article being removed from the apron in one lateral direction or the other depending upon which rail of said pair is engaged by the cam follower; and means causing a selected cam follower to be engaged by a selected one of the switch means which is in active position.

2. The combination defined in claim 1 in which said control means includes a plurality of means for storing signals representative of the length of individual articles to be sorted from the conveyor means, there being one storage means controlling the switches associated with each pair of switch means, and the storage means causing an output signal having the same time duration as the stored signal to be supplied to actuate selected pairs of switch means in timed relation to the travel of the measured article.

References Cited

UNITED STATES PATENTS

| 2,868,394 | 1/1959 | Greller | 214—11 |
| 3,361,247 | 1/1968 | Lauzon | 198—185 X |

ALLEN N. KNOWLES, *Primary Examiner.*

RICHARD A. SCHACHER, *Assistant Examiner.*

U.S. Cl. X.R.

198—185